United States Patent
Zhong et al.

(10) Patent No.: US 12,544,721 B2
(45) Date of Patent: Feb. 10, 2026

(54) PREPARATION METHOD OF ORGANOSILICA/CERAMIC COMPOSITE MEMBRANE WITH A GRADIENT PORE STRUCTURE

(71) Applicant: Changzhou University, Changzhou (CN)

(72) Inventors: Jing Zhong, Changzhou (CN); Rong Xu, Changzhou (CN); Meng Guo, Changzhou (CN); Xiuxiu Ren, Changzhou (CN); Yaohui Wang, Changzhou (CN); Yihan Zhang, Changzhou (CN); Tiandan Lu, Changzhou (CN); Dongliang Jin, Changzhou (CN); Ting Qi, Changzhou (CN)

(73) Assignee: Changzhou University, Changzhou (CN)

( * ) Notice: Subject to any disclaimer, the term of this patent is extended or adjusted under 35 U.S.C. 154(b) by 776 days.

(21) Appl. No.: 17/888,517

(22) Filed: Aug. 16, 2022

(65) Prior Publication Data
US 2024/0001310 A1    Jan. 4, 2024

(30) Foreign Application Priority Data
Jun. 30, 2022   (CN) .......................... 202210771986.7

(51) Int. Cl.
*B01D 69/12*    (2006.01)
*B01D 61/14*    (2006.01)
(Continued)

(52) U.S. Cl.
CPC ....... *B01D 69/1218* (2022.08); *B01D 61/147* (2013.01); *B01D 67/0048* (2013.01);
(Continued)

(58) Field of Classification Search
CPC ............ B01D 69/1218; B01D 71/0213; B01D 71/0221; B01D 61/147; B01D 67/0048;
(Continued)

(56) References Cited

U.S. PATENT DOCUMENTS

| | | | | |
|---|---|---|---|---|
| 5,120,576 A | * | 6/1992 | Goldsmith | .............. C04B 41/52 427/247 |
| 2005/0031791 A1 | * | 2/2005 | Sasaki | .................. C09D 183/14 524/556 |

(Continued)

FOREIGN PATENT DOCUMENTS

| | | | | |
|---|---|---|---|---|
| CN | 104841294 A | * | 8/2015 | ............. C01D 67/00 |
| CN | 108246130 A | * | 7/2018 | ............. B01D 71/68 |

(Continued)

*Primary Examiner* — Patricia L. Hailey
(74) *Attorney, Agent, or Firm* — IDEA Intellectual Limited; Sam T. Yip (57) ABSTRACT

The present disclosure discloses a preparation method of an organosilica/ceramic composite membrane with a gradient pore structure. The preparation method comprises: (1) selecting a porous ceramic material as a membrane support layer; (2) gradually replacing a solvent with water to prepare zirconium colloidal sols with different particle sizes, and successively coating the prepared zirconium colloidal sols onto a ceramic support from large to small so as to form a membrane transition layer with a gradient pore structure; and (3) catalytically synthesizing an organosilica polymeric sol using hydrochloric acid, coating the prepared organosilica sol onto the preheated transition layer through ultrasonic thermal spraying to undergo heat treatment, so as to prepare the organosilica/ceramic composite membrane with the gradient pore structure. According to the present disclosure, the transition layer with the gradient pore structure is prepared by using the zirconium colloidal sols with different particle sizes. An ultrathin defect-free organosilica separation layer is prepared through ultrasonic thermal spraying.

(Continued)

As a result, the obtained organosilica/ceramic composite membrane can be applied to the fields of salt-containing dye wastewater treatment and polypeptide bioactive substance separation.

10 Claims, 4 Drawing Sheets

(51) Int. Cl.
  *B01D 67/00* (2006.01)
  *B01D 69/06* (2006.01)
  *B01D 71/02* (2006.01)
(52) U.S. Cl.
  CPC ......... *B01D 67/0083* (2013.01); *B01D 69/06* (2013.01); *B01D 71/0213* (2022.08); *B01D 71/0221* (2022.08); *B01D 2323/081* (2022.08); *B01D 2323/219* (2022.08); *B01D 2325/02834* (2022.08)
(58) Field of Classification Search
  CPC ................ B01D 67/0083; B01D 69/06; B01D 2323/219; B01D 2323/081; B01D 2325/02834

USPC ................ 502/4; 516/90, 34, 53, 55; 252/60
See application file for complete search history.

(56) References Cited

U.S. PATENT DOCUMENTS

| 2017/0232402 | A1 | * | 8/2017 | Xiao | ................ | B01D 69/081 |
| | | | | | | 210/500.23 |
| 2020/0086277 | A1 | * | 3/2020 | Wang | ............... | B01D 67/00043 |

FOREIGN PATENT DOCUMENTS

| CN | 106110909 | B | * | 9/2018 | ............. | B01D 67/00 |
| CN | 109173731 | A | * | 1/2019 | ........ | B01D 67/0081 |
| CN | 109433018 | A | * | 3/2019 | ......... | B01D 67/0079 |
| CN | 109821430 | A | * | 5/2019 | ............. | B01D 61/36 |
| CN | 113797761 | A | * | 12/2021 | ........ | B01D 67/0079 |
| CN | 114377555 | A | * | 4/2022 | ............. | B01D 69/02 |
| CN | 111359446 | A | * | 7/2022 | .......... | B01D 61/025 |
| CN | 115025634 | A | * | 9/2022 | ............. | B01D 69/12 |
| JP | H11244676 | A | * | 9/1999 | ............. | B01D 53/22 |
| JP | 2009233540 | A | * | 10/2009 | ............. | B01D 69/12 |
| JP | 2016221453 | A | * | 12/2016 | ............. | B01D 69/10 |

* cited by examiner

PREPARATION METHOD OF ORGANOSILICA/CERAMIC COMPOSITE MEMBRANE WITH A GRADIENT PORE STRUCTURE

FIELD OF THE INVENTION

The present disclosure relates to the technical field of composite membrane preparation, and it specifically relates to a preparation method of an organosilica/ceramic composite membrane with a gradient pore structure.

BACKGROUND OF THE INVENTION

In most cases, the traditional separation membrane is generally composed of a support and a separation layer, which is in a multi-layer asymmetric structure. The separation performance of the membrane mainly depends on the separation layer, and the support can provide sufficient mechanical strength. The porous ceramic support has many excellent properties, however, it has a large pore size and a rough surface, so direct preparation of a separation layer with a sub-nano pore channel on the porous ceramic support can easily cause defects. Therefore, a transition layer is generally introduced on the porous ceramic membrane (microfiltration/ultrafiltration) support to reduce the pore size and the surface roughness of the support when the molecular separation membrane is prepared. The traditional transition layer is complicated to make. Materials with similar structures are often coated onto the support for 8-10 times or more, so as to form a single-structure transition layer with a thickness of more than 1 μm, leading to large membrane thickness, high mass transfer resistance and low membrane flux.

Moreover, the well-developed large-scale manufacturing technology for organic membranes, such as interface polymerization, dip-coating, scrape coating and other membrane coating technologies, is not suitable for organic-inorganic hybrid membranes due to structural properties of the porous ceramic support layer. For example, the thickness of the membrane is hard to adjust and uneven in distribution when the common dip-coating method is used for preparing the membrane, thereby causing reduction in membrane flux. Scrape coating and wipe coating methods have low reproducibility when being used for preparing the membrane, which easily causes defects.

SUMMARY OF THE INVENTION

The objective of this part is to summarize some aspects of the embodiments of the present disclosure and briefly describe some preferred embodiments. Some simplifications or omissions may be made in this part and in the abstract of the specification and the invention name of the present application to avoid this part, the abstract of the specification and the invention name to be obscure, but such the simplifications or omissions cannot be used for limiting the scope of the present disclosure.

In view of the problems in the existing composite membrane preparation technologies, the present disclosure is proposed.

Therefore, the present disclosure provides an organosilica/ceramic composite membrane with a gradient pore structure in order to overcome the defects in the existing composite membrane preparation technologies.

In order to solve the above problems, the present disclosure provides the following technical solution: an organosilica/ceramic composite membrane with a gradient pore structure, comprising:

(1) adding an alcohol zirconium reagent into isopropanol to be stirred and dissolved, then adding water and hydrochloric acid, heating the above solution to be boiled and maintaining the boiling state, and gradually adding water during the boiling to replace isopropanol, so as to prepare four zirconium colloidal sols with different particle sizes through four different aging times;

(2) successively coating the zirconium colloidal sols onto an α-$Al_2O_3$ ceramic support in a particle size order from large to small and respectively calcining, so as to form a membrane transition layer with a gradient pore structure;

(3) catalyzing hydrolytic polymerization reaction of an organosilica precursor and an isopropanol solution with water by adding hydrochloric acid to obtain an organosilica polymeric sol; and (4) evenly spraying the organosilica polymeric sol on the prepared membrane transition layer through an ultrasonic thermal spraying technology to undergo heat treatment, so as to prepare the organosilica/ceramic composite membrane.

As one preferred embodiment of the preparation method of the composite membrane of the present disclosure, the alcohol zirconium reagent is one or more of zirconium ethoxide $Zr(OC_2H_5)_4$, zirconium n-propoxide $Zr(OC_3H_7)_4$, zirconium isopropoxide $Zr(O(CH(CH_3)_2)_4$ and zirconium n-butoxide $Zr(OC_4H_9)_4$.

As one preferred embodiment of the preparation method of the composite membrane of the present disclosure, a molar ratio of the zirconium sol to isopropanol to water to hydrochloric acid is 1:40-120:20-40:0.1-0.2, the final volume of the solution is 500 mL by adding water, water was supplemented every 5-8 min to ensure that the volume of the solution is still 500 mL, and the concentration of hydrochloric acid is 37 wt %.

As one preferred embodiment of the preparation method of the composite membrane of the present disclosure, the aging times are respectively controlled as 2 h, 4 h, 6 h and 8 h, and the zirconium colloidal sols have particle sizes of 20 nm, 50 nm, 100 nm and 200 nm respectively.

As one preferred embodiment of the preparation method of the composite membrane of the present disclosure, the ceramic support is an α-$Al_2O_3$ flat microfiltration membrane, and the support has a porosity of 50% and an average pore of 200 nm; after coating each time, the calcining time is 500-600° C.

As one preferred embodiment of the preparation method of the composite membrane of the present disclosure, the silicon source precursor is one or two of 1,3-bis (triethoxysilyl) propane (BTESP), 1,2-bis (triethoxysilyl) ethylene (BETSE), 1,4-bis (triethoxysilyl) benzene (BTESB).

As one preferred embodiment of the preparation method of the composite membrane of the present disclosure, a molar ratio of organosilica precursor to deionized water to hydrochloric acid is 1:60-120:0.1, the reaction temperature is the reaction time is 2 h, and the concentration of hydrochloric acid is 37 wt %.

As one preferred embodiment of the preparation method of the composite membrane of the present disclosure, the ultrasonic power of an ultrasonic atomizer is Hz, the concentration of a feed solution is 0.5-5 wt %, the flow rate of the feed solution is 0.1-0.5 ml/min, the flow of a carrier gas is 0.01-0.03 MPa, spraying is performed vertically downwards, a distance between a sprayer nozzle and a ceramic support is 2-3 cm, and single spraying lasts for 1-2 min for 2 times in total.

As one preferred embodiment of the preparation method of the composite membrane of the present disclosure, the surface temperature of the preheated transition layer is 50-60° C., the size of the heated substrate is 20×20 cm.

As one preferred embodiment of the preparation method of the composite membrane of the present disclosure, the heat treatment is performed for 20-30 min at 100-150° C. in an air atmosphere.

The present disclosure has the beneficial effects:
(1) Various layers of zirconium colloidal sols prepared in the present disclosure are closely combined with each other to form the flat membrane transition layer with the gradient pore structure so as to achieve pore gradient transition from the support to the separation layer. Thin transition layer and small mass transfer resistance are conducive to preparing an ultrathin defect-free separation layer.
(2) The present disclosure adopts ultrasonic thermal spraying. The transition layer is preheated during the spraying so that the solvent on the surface of the transition layer is quickly evaporated. The intravasation of the colloidal sol on the separation layer is reduced. The porosity of the membrane is increased. The mass transfer resistance is reduced. And the membrane flux is improved.

BRIEF DESCRIPTION OF THE DRAWINGS

For more clearly illustrating the technical solution in the embodiments of the present disclosure, accompanying drawings required to be used in the embodiments would be simply described below. Obviously, the accompanying drawings in the following descriptions are only some embodiments of the present disclosure, and other accompanying drawings can also be obtained by persons of ordinary skill in the art according to these accompanying drawings without creative efforts, of which.

DETAILED DESCRIPTION OF THE EMBODIMENTS

Figure 1:
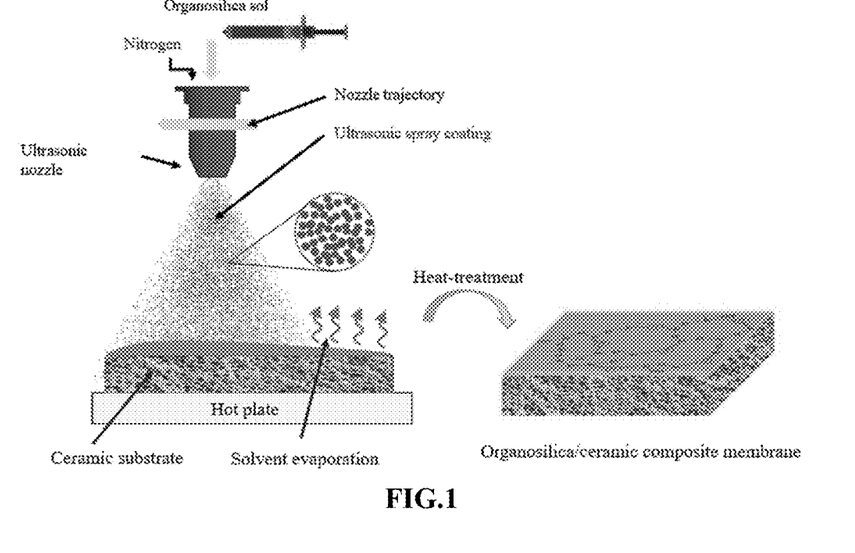
FIG. 1 is a diagram of an organosilica membrane prepared through ultrasonic thermal spraying.
Figure 2:
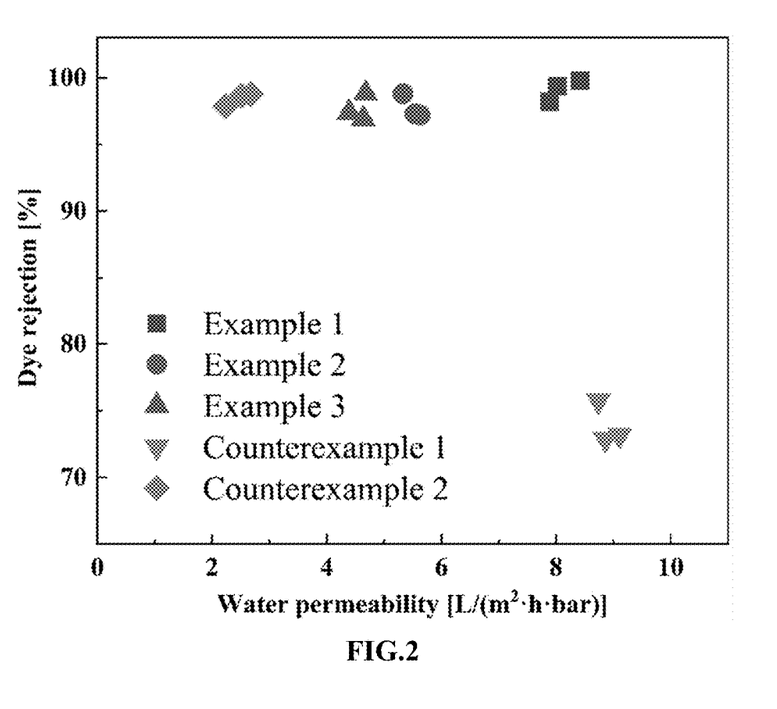
FIG. 2 is a dye separation performance trade-off diagram according to examples 1, 2 and 3 and counter examples 1 and 2.
Figure 3:
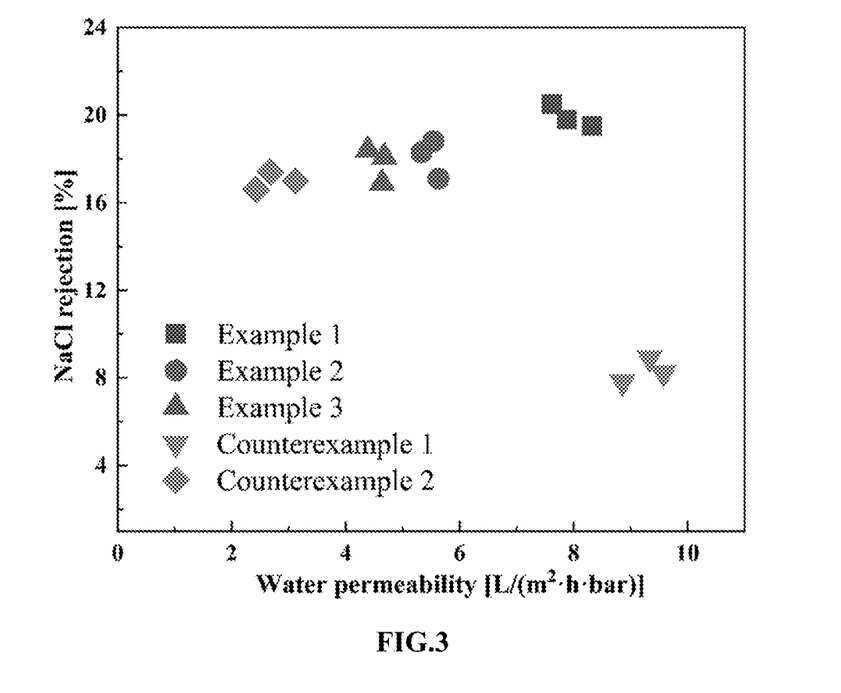
FIG. 3 is a NaCl separation performance trade-off diagram according to examples 1, 2 and 3 and counter examples 1 and 2.
Figure 4:
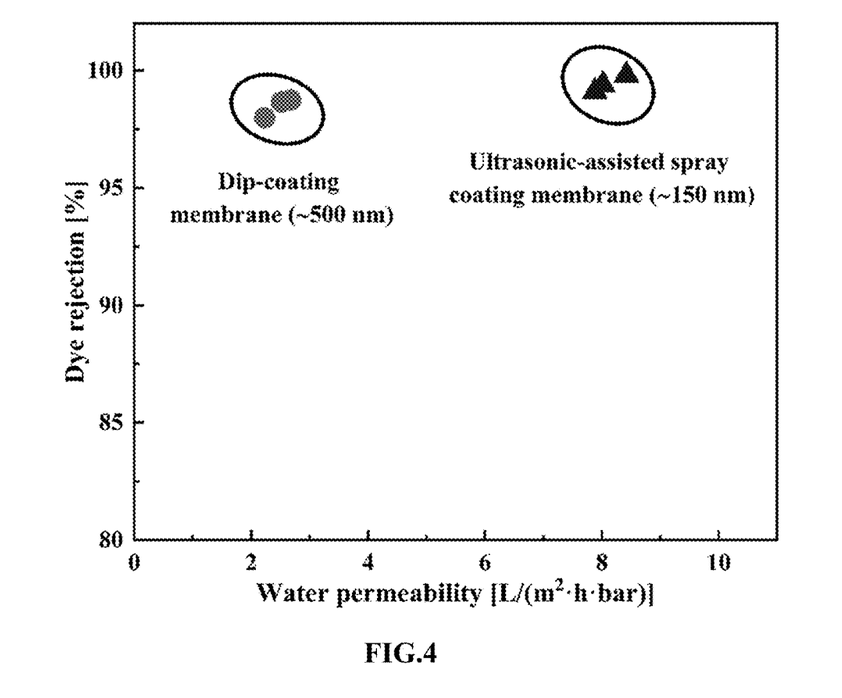
FIG. 4 is a thickness and dye separation performance comparison diagram of membranes prepared by a dip-coating method and an ultrasonic thermal spraying method according to the example 1 and the counter example 2.
Figure 5:
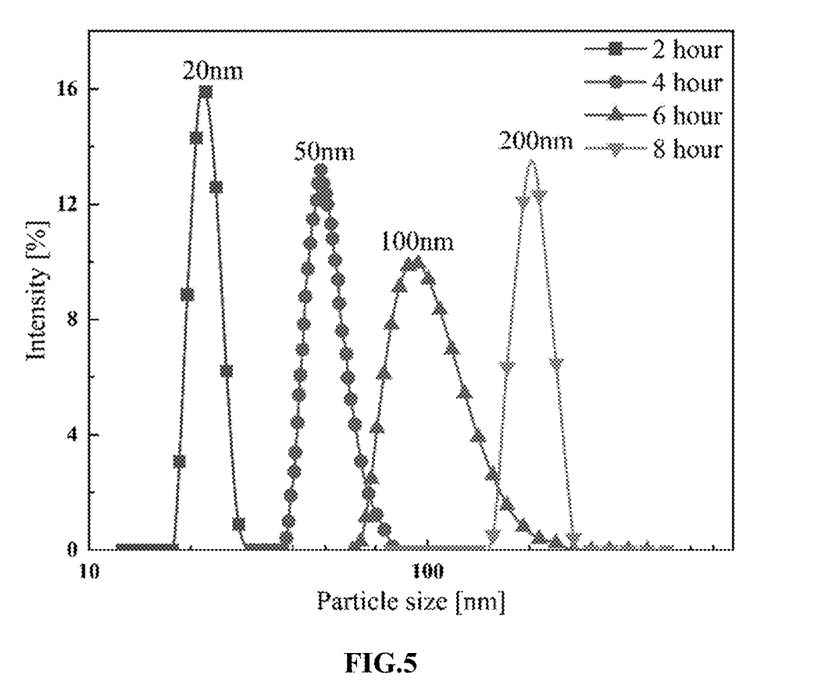
FIG. 5 is a diagram of four colloidal sols with different particle sizes according to the example 1.
Figure 6:
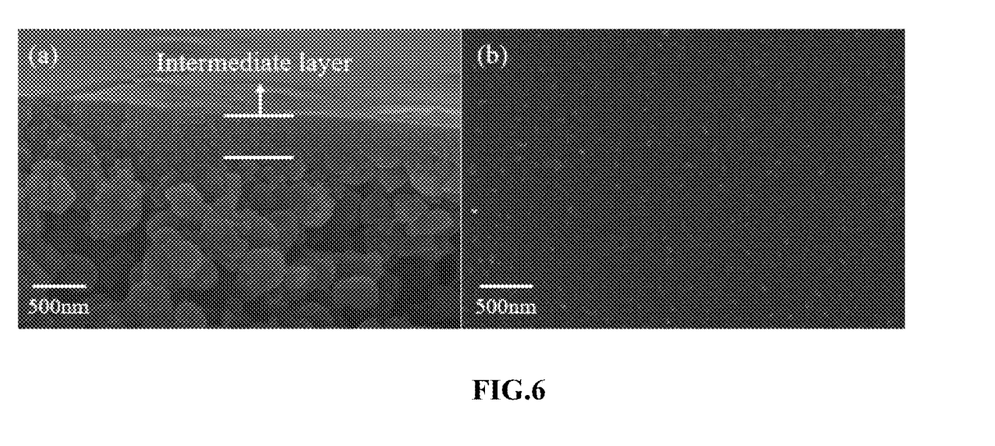
FIG. 6 is a scanning electron microscope (SEM) image of a section (a) and a surface (b) of a membrane transition layer prepared according to the example 1.
Figure 7:
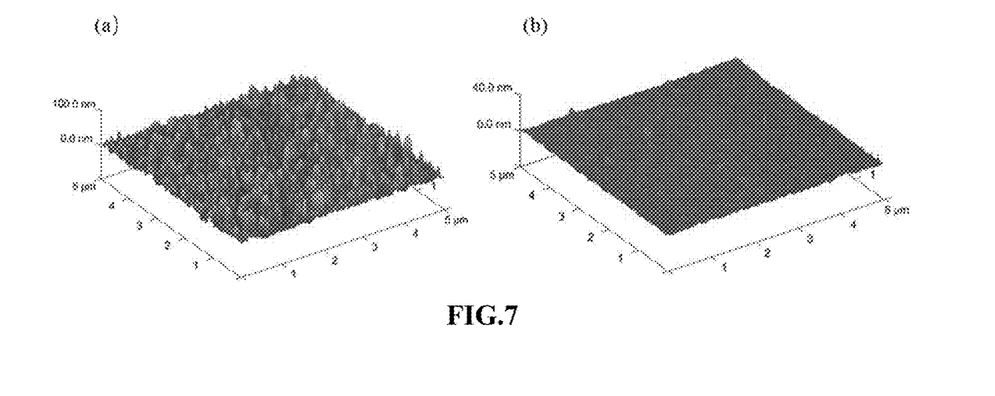
FIG. 7 is an atomic force microscope (AFM) image of a transition layer (a) and a separation layer (b) of a separation membrane prepared according to the example 1.
Figure 8:
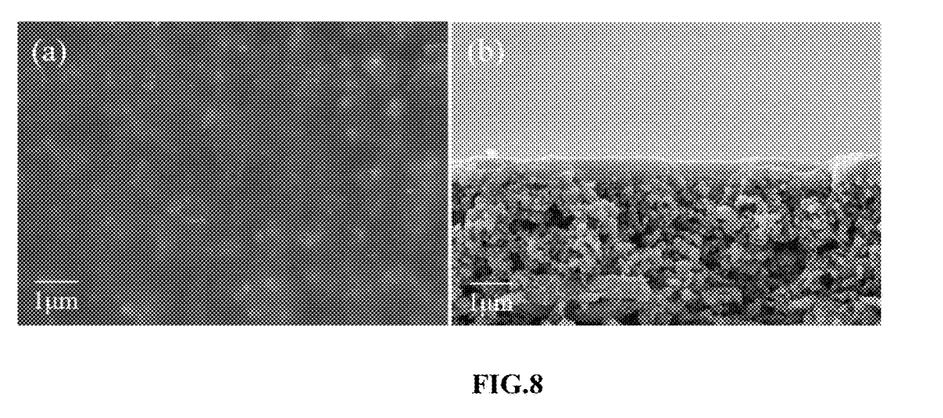
FIG. 8 is an SEM image of a section (a) and a surface (b) of a membrane transition layer prepared according to the example 2.

The features and the advantages of the present disclosure are more apparent and understandable, detailed descriptions would be provided to specific embodiments of the present disclosure in combination with examples of the specification.

The following description set forth many details so as to sufficiently understand the present disclosure, however the present disclosure can also be implemented by using other modes different from those described herein, those skilled in the art can make similar promotion without departing from the connotation of the present disclosure, and therefore the present disclosure is not limited by specific examples disclosed below.

Next, "one embodiment" or "embodiment" described here is included in specific features, structures or properties of at least one implementation mode of the present disclosure. "In one embodiment" occurring in different places of the specification does not refer to the same embodiment, nor are they separately or selectively exclusive from other embodiments.

Example 1

(1) 15.36 g of zirconium n-butoxide ($ZrO_4C_{16}H_{36}$) was added into 134.64 got isopropanol (IPA) solution and then continuously, stirred for 60 min. so that the alcohol zirconium reagent was completely dissolved; subsequently, 14.4 g of deionized water and 0.39 g of 37% concentrated hydrochloric acid solution were added into the above solution and then continuously stirred for 60 min, so that the mixed solution was partially hydrolyzed and polymerized.

(2) Water was added into the alcohol zirconium solution obtained in step (1) so that the final volume of the solution was 500 ml, the above solution was heated and was kept boiling, and water was supplemented every 5-8 min in the processes of heating and boiling to ensure that the volume of the solution was still 500 mL, wherein the processes of adding water and boiling lasted for 2 h, and then the solution was naturally cooled by standing to prepare a zirconium colloidal sol of 20 nm. The step (2) was repeated, 50 nm, and zirconium colloidal sols of 100 nm and 200 nm were prepared by changing the aging time as 4 h, 6 h and 8 h.

(3) The zirconium sol of 200 nm prepared in step (2) was evenly coated onto an $\alpha$-$Al_2O_3$ ceramic support through a thermal spraying method and then calcined for min at 600° C. The step (3) was repeated, and zirconium colloidal sols of 100 nm, 50 nm and 20 nm were successively coated onto the $\alpha$-$Al_2O_3$ ceramic support to form a membrane transition layer with a gradient pore structure.

(4) Hydrolysis-polymerization reaction was performed on 1,3-bis (triethoxysilyl) propane (BTESP) as a silicon source precursor, hydrochloric acid as a catalyst and an isopropanol solution with water. A molar ratio of BTESP to water to hydrochloric acid was 1:60:0.1, and the solution was stirred for 2 h at 40° C. to obtain a BTESP sol.

(5) The BTESP sol prepared in step (4) was diluted to 1 wt %. An ultrasonic feed rate was set as 0.2 ml/min. An ultrasonic frequency was set as 1.8 Hz. The height of a sprayer nozzle was set as 30 nm. The sol was evenly dispersed into tiny droplets through ultrasonication and entered a deposition chamber along with nitrogen, wherein the flow of a carrier gas was 0.02 MPa. The porous ceramic support was preheated to by using a substrate heating device. The tiny droplets were deposited onto the preheated membrane transition layer from an ultrasonic sprayer nozzle. The next spraying was performed after standing for 1 min following the spraying. Two times are sprayed in total, and then the membrane was subjected to heat treatment for 30 min at 150° C. after deposition was ended, so as to obtain an organosilica/ceramic composite membrane. The prepared membrane was applied to a salt-containing dye separation system (100 ppm methylene blue, and 1000 ppm NaCl).

Example 2 (with a Different Silicon Source Precursor)

(1) 15.36 g of zirconium n-butoxide ($ZrO_4C_{16}H_{36}$) was added into 134.64 g of isopropanol (IPA) solution and then continuously stirred for 60 min, so that the alcohol zirconium reagent was completely dissolved. Subsequently, 14.4 g of deionized water and 0.39 g of 37% concentrated hydrochloric acid solution were added in the above solution and then continuously stirred for 60 min, so that the mixed solution was partially hydrolyzed and polymerized.

(2) Water was added into the alcohol zirconium solution obtained in step (1) so that the final volume of the solution was 500 ml, the above solution was heated and was kept boiling, and water was supplemented every 5-8 min in the processes of heating and boiling to ensure that the volume of the solution was still 500 mL. The processes of adding water and keeping boiling lasted for 2 h, and then the solution was naturally cooled by standing to prepare a zirconium sol of 20 nm. The step (2) was repeated, and zirconium colloidal sols of 50 nm, 100 nm and 200 nm were prepared by changing the aging time as 4 h, 6 h and 8 h.

(3) The zirconium sol of 200 nm prepared in step (2) was evenly coated onto an $\alpha$-$Al_2O_3$ ceramic support through thermal spraying and then calcined for 30 min at 600° C. The step (3) was repeated, and zirconium colloidal sols of 100 nm, 50 nm and nm were successively coated onto the $\alpha$-$Al_2O_3$ ceramic support to form a membrane transition layer with a gradient pore structure.

(4) Hydrolysis-polymerization reaction was performed on 1,4-bis (triethoxysilyl) benzene (BTESB) as a silicon source precursor, hydrochloric acid as a catalyst and an isopropanol solution with water. A molar ratio of BTESB to water to hydrochloric acid was 1:120:0.2, and the solution was stirred for 2 h at 60° C. to obtain a BTESB sol.

(5) The BTESB sol prepared in step (4) was diluted to 1 wt %, an ultrasonic feed rate was set as 0.15 ml/min, an ultrasonic frequency was set as 1.5 Hz. The height of a sprayer nozzle was set as 30 nm. The sol was evenly dispersed into tiny droplets through ultrasonication and entered a deposition chamber along with nitrogen, wherein the flow of a carrier gas was 0.02 MPa. The porous ceramic support was preheated to by using a substrate heating device. Tiny droplets were deposited on the preheated membrane transition layer from an ultrasonic sprayer nozzle. The next spraying was performed after standing for 1 min following the spraying for spraying 2 times in total, and then the membrane was subjected to heat treatment for 30 min at 150° C. after deposition was ended, so as to obtain an organosilica/ceramic composite membrane. The prepared membrane was applied to a salt-containing dye separation system (100 ppm methylene blue, and 1000 ppm NaCl).

Example 3 (with a Different Preheating Temperature)

(1) 15.36 g of zirconium n-butoxide ($ZrO_4C_{16}H_{36}$) was added into 134.64 g of isopropanol IPA, solution and then continuously stirred for 60 min, so that the alcohol zirconium reagent was completely dissolved. Subsequently, 14.4 g of deionized water and 0.39 g of 37% concentrated hydrochloric acid solution were added in the above solution and then continuously stirred for 60 min, so that the mixed solution was partially hydrolyzed and polymerized.

(2) Water was added into the alcohol zirconium solution obtained in step (1) so that the final volume of the solution was 500 ml. The above solution was heated and kept boiling, and water was supplemented every 5-8 min in the processes of heating and boiling to ensure that the volume of the solution was still 500 mL, wherein the processes of adding water and keeping boiling lasted for 2 h, and then the solution was naturally cooled by standing to prepare a zirconium sol of 20 nm. The step (2) was repeated, and zirconium colloidal sols of 50 nm, 100 nm and 200 nm were prepared by changing the aging time as 4 h, 6 h and 8 h.

(3) The zirconium sol of 200 nm prepared in step (2) was evenly coated onto an $\alpha$-$Al_2O_3$ ceramic support through thermal spraying and then calcined for 30 min at 550° C. The step (3) was repeated, and zirconium colloidal sols of 100 nm, 50 nm and nm were successively coated onto the $\alpha$-$Al_2O_3$ ceramic support to form a membrane transition layer with a gradient pore structure.

(4) Hydrolysis-polymerization reaction was performed on 1,3-bis (triethoxysilyl) propane (BTESP) as a silicon source precursor, hydrochloric acid as a catalyst and an isopropanol solution with water. A molar ratio of BTESP to water to hydrochloric acid was 1:60:0.1, and the solution was stirred for 2 h at 60° C. to obtain a BTESP sol.

(5) The BTESP sol prepared in step (4) was diluted to 1 wt %, an ultrasonic feed rate was set as 0.2 ml/min, an ultrasonic frequency was set as 1.8 Hz, the height of a sprayer nozzle was set as 30 nm, the sol was evenly dispersed into tiny droplets through ultrasonication and entered a deposition chamber along with nitrogen, wherein the flow of a carrier gas was 0.02 MPa. Tiny droplets were deposited on the preheated membrane transition layer from an ultrasonic sprayer nozzle. The next spraying was performed after standing for 1 min following the spraying for spraying 2 times in total, and then the membrane was subjected to heat treatment for 30 min at 100° C. after deposition was ended, so as to obtain an organosilica/ceramic composite membrane. The prepared membrane was applied to a salt-containing dye separation system (100 ppm methylene blue, and 1000 ppm NaCl).

Counter Example 1 (with a Different Transition Layer Preparation Method)

(1) Hydrolysis-polymerization reaction was performed on 1,3-bis (triethoxysilyl) propane (BTESP) as a silicon source precursor, hydrochloric acid as a catalyst and an isopropanol solution with water. A molar ratio of BTESP to water to hydrochloric acid was 1:60:0.1, and the solution was stirred for 2 h at 40° C. to obtain a BTESP sol.

(2) Two $\alpha$-$Al_2O_3$ particles with different particle sizes (1 μm and 0.2 μm) were respectively coated onto a chip ceramic support through a hot coating method and then roasted for 15 min in a muffle furnace at 600° C., each of the two particles was coated twice to generate a particle layer. After that, a $SiO_2$—$ZrO_2$ sol was coated onto the surface of the particle layer, and then the above particle layer was roasted for 20 min in the muffle furnace at 600° C., and a nano transition layer was generated after repeating for 4 times.

(3) The BTESP sol prepared in step (1) was diluted to 1 wt %, an ultrasonic feed rate was set as 0.2 ml/min. An ultrasonic frequency was set as 1.8 Hz. The height of a sprayer nozzle was set as 30 nm. The sol was evenly dispersed into tiny droplets through ultrasonication and entered a deposition chamber along with nitrogen, wherein the flow of a carrier gas was 0.02 MPa. A porous ceramic support was preheated to by using a substrate heating device. The tiny droplets were deposited on the preheated membrane transition layer from an ultrasonic sprayer nozzle. The next spraying was performed after standing for 1 min following the spraying for spraying 2 times in total, and then the membrane was subjected to heat treatment for 30 min at 150° C. after deposition was ended, so as to obtain an organosilica/ceramic composite membrane. The prepared membrane was applied to a salt-containing dye separation system (100 ppm methylene blue, and 1000 ppm NaCl).

Comparative Example 2 (with a Different Separation Layer Preparation Method)

All of specific operations of steps (1), (2), (3) and (4) are the same as those in example 1.

(5) The organosilica sol prepared in step (4) was coated onto a membrane transition layer with a gradient pore structure through a dip-coating method, wherein the ceramic support was dipped into the organosilica sol for 40 s, dried for 7 min in the air at room temperature, and then calcined for 200° C. The calcination atmosphere was air, and the organosilica/ceramic composite membrane was prepared by repeating this process for 3 times. The prepared membrane was applied to a salt-containing dye separation system (100 ppm methylene blue, and 1000 ppm NaCl).

TABLE 1

Separation data table of examples 1-3 and counter examples 1-2

| Serial number | Water flux [L/m² h bar] | Dye rejection [%] | Salt rejection [%] |
|---|---|---|---|
| Example 1 | 7.88 | 97.23 | 19.82 |
|  | 7.62 | 99.45 | 20.54 |
|  | 8.32 | 99.81 | 19.50 |
| Example 2 | 5.63 | 97.32 | 17.18 |
|  | 5.54 | 96.27 | 18.87 |
|  | 5.33 | 98.86 | 18.36 |
| Example 3 | 4.68 | 98.80 | 18.15 |
|  | 4.64 | 94.97 | 16.93 |
|  | 4.39 | 97.46 | 18.45 |
| Counter example 1 | 9.33 | 73.15 | 8.92 |
|  | 8.86 | 72.84 | 7.86 |
|  | 9.58 | 76.70 | 8.22 |
| Counter example 2 | 2.43 | 96.85 | 16.63 |
|  | 2.63 | 98.75 | 17.46 |
|  | 3.12 | 98.66 | 16.90 |

According to the present disclosure, water is used to gradually replace the isopropanol solvent so as to prepare zirconium colloidal sols with different particle sizes. The alcohol zirconium reagent is hydrolyzed and polymerized in the presence of a catalyst during the preparation of the transition layer sol. Use of alcohol as the solvent can slow down its cross-linking reaction to produce a linearly polymerized zirconium sol with a dense network structure. In the present disclosure, the isopropanol solvent is first used to dissolve ziroxane. Water is gradually added during the reaction so that ziroxane undergoes micro-hydrolysis reaction, and the isopropanol solvent is gradually replaced by heating so as to gradually form a nano micelle stacking structure, thereby increasing the particle size of the sol. Four zirconium colloidal sols with different particle sizes are prepared and coated onto the ceramic support in the particle size order from large to small, and various layers of zirconium colloidal sols are closely combined from each other to form a flat membrane transition layer with a gradient pore structure so as to achieve gradient pore transition from the support to the separation layer. Thin transition layer thickness and small mass transfer resistance are conducive to preparing the ultrathin defect-free separation layer.

In the present disclosure, the zirconium sol is selected as the transition layer of the ceramic membrane, and its main function is to fill the defects, reduce the pore size, and form the membrane transition layer with the gradient pore structure. The solution easily permeates into the pore channels and blocks them. The separation membrane cannot be directly prepared on the ceramic membrane Since the pore size of the ceramic membrane is basically 50 nm or more, the manufacturing process is difficult . . . . Therefore, the film transition layer with the gradient pore structure is first prepared on the ceramic membrane, which is conducive to preparing the ultrathin defect-free separation layer.

The ultrathin defect-free separation layer is prepared through ultrasonic thermal spraying.

The silica sol is continuously atomized by utilizing the cavitation effect of ultrasonic vibration to form high-quality homogeneous fine droplets, and the high-quality homogeneous fine droplets are then delivered to the preheated ceramic support through a carrier gas to form the membrane separation layer. Compared with the traditional single-fluid or double-fluid spraying technology, ultrasonic thermal spraying has the advantages of uniform and flat separation layer and thin thickness (which can minimally be as thin as 20 nm). During the spraying, the transition layer is preheated so that the solvent on the surface of the transition layer is rapidly evaporated, thereby reducing the infiltration of the sol on the separation layer, increasing the porosity of the membrane, reducing the mass transfer resistance, and improving the membrane flux.

It should be noted that the above examples are only for illustrating the technical solution of the present disclosure but not limiting the present disclosure. Although the present disclosure is described in detail by reference to preferred embodiments, persons of ordinary skill in the art should be understood that amendments or equivalent replacements can be made to the technical solution of the present disclosure without departing from the spirit and scope of the technical solution of the present disclosure, which are all included within the scope of the appended claims of the present disclosure.

The invention claimed is:

1. A method of preparing an organosilica/ceramic composite membrane with a gradient pore structure, comprising:
   preparation of a zirconium colloidal sol by: adding an alcohol zirconium reagent into isopropanol to be stirred and dissolved, then adding water and hydrochloric acid, heating the above solution to be boiled and maintaining the boiling state, and gradually adding water during the boiling to replace isopropanol, so as to prepare four zirconium colloidal sols with different particle sizes through four different aging times;
   preparation of a membrane transition layer: successively coating the zirconium colloidal sols onto an α-Al₂O₃ ceramic support in a particle size order from large to small and respectively calcining, so as to form a membrane transition layer with a gradient pore structure;
   preparation of a silicon sol by: catalyzing hydrolytic polymerization reaction of an organosilica precursor and an isopropanol solution with water by adding hydrochloric acid to obtain an organosilica polymeric sol; and
   preparation of a composite membrane by: evenly spraying the organosilica polymeric sol on the prepared membrane transition layer through an ultrasonic thermal spraying technology to undergo heat treatment, so as to prepare the organosilica/ceramic composite membrane.

2. The method of preparing the organosilica/ceramic composite membrane with the gradient pore structure according to claim 1, wherein the alcohol zirconium reagent is one or more of zirconium ethoxide $Zr(OC_2H_5)_4$, zirconium n-propoxide $Zr(OC_3H_7)_4$, zirconium iso-propoxide $Zr(O(CH(CH_3)_2)_4$, and zirconium n-butoxide $Zr(OC_4H_9)_4$.

3. The method of preparing the organosilica/ceramic composite membrane with the gradient pore structure according to claim 1, wherein a molar ratio of the zirconium sol to isopropanol to water to hydrochloric acid is 1:40-120:20-40:0.1-0.2, the final volume of the solution is 500 mL by adding water, water was supplemented every 5-8 min to ensure that the volume of the solution is still 500 mL, and the concentration of hydrochloric acid is 37 wt %.

4. The method of preparing the organosilica/ceramic composite membrane with the gradient pore structure according to claim 1, wherein the aging times are respectively controlled as 2 h, 4 h, 6 h and 8 h, and the zirconium colloidal sols have particle sizes of 20 nm, 50 nm, 100 nm and 200 nm respectively.

5. The method of preparing the organosilica/ceramic composite membrane with the gradient pore structure according to claim 1, wherein the ceramic support is an $\alpha$-$Al_2O_3$ flat microfiltration membrane, and the support has a porosity of 50% and an average pore size of 200 nm; and after coating each time, the calcining time is 500-600° C.

6. The method of preparing the organosilica/ceramic composite membrane with the gradient pore structure according to claim 1, wherein the organosilica precursor is one or two of 1,3-bis(triethoxysilyl) propane (BTESP), 1,2-bis(triethoxysilyl) ethylene (BETSE), 1,4-bis(triethoxysilyl) benzene (BTESB).

7. The method of preparing the organosilica/ceramic composite membrane with the gradient pore structure according to claim 1, wherein a molar ratio of an organosilica precursor to water to hydrochloric acid is 1:60-120:0.1, the reaction temperature is 40-60° C., the reaction time is 2 h, and the concentration of hydrochloric acid is 37 wt %.

8. The method of preparing the organosilica/ceramic composite membrane with the gradient pore structure according to claim 1, wherein the ultrasonic power of the ultrasonic thermal spraying technology is 0.5-3 Hz, the concentration of a feed solution is 0.5-5 wt %, the flow rate of the feed solution is 0.1-0.5 ml/min, the flow of a carrier gas is 0.01-0.03 MPa, spraying is performed vertically downwards, a distance between a sprayer nozzle and the prepared membrane transition layer is 2-3 cm, and single spraying lasts for 1-2 min for 2 times in total.

9. The method of preparing the organosilica/ceramic composite membrane with the gradient pore structure according to claim 1, wherein the ultrasonic thermal spraying technology comprises preheating the membrane transition layer to have a surface temperature of 50-60° C. utilizing a substrate heating device.

10. The method of preparing the organosilica/ceramic composite membrane with the gradient pore structure according to claim 1, wherein the heat treatment is performed for 20-30 min at 100-150° C. in an air atmosphere.

* * * * *